Patented Mar. 2, 1943

2,312,344

UNITED STATES PATENT OFFICE 2,312,344

POLYHYDRIC ALCOHOLS OF THE ETIO-CHOLANE AND PREGNANE SERIES AND THE MANUFACTURE THEREOF

Willy Logemann, Berlin-Charlottenburg, Germany, assignor, by mesne assignments, to Schering Corporation, Bloomfield, N. J., a corporation of New Jersey No Drawing. Application July 10, 1937, Serial No. 153,002. In Germany July 14, 1936

16 Claims. (Cl. 260—348)

This invention relates to polyhydric alcohols of the etio-cholane and pregnane series and the manufacture thereof.

The process of manufacture according to one feature of the invention consists in that unsaturated compounds of the cyclopentano polyhydro phenanthrene series of the type specified below are subjected to the action of agents adding on oxygen and on the oxides thereby produced hydrolysing agents are allowed to act.

The compounds serving as starting materials can belong either to the etio-cholane or to the pregnane series and can have in the ring system a carbon-carbon double bond; they can however also be compounds of the etio-cholane series with unsaturated side chain on the carbon atom 17, which compounds can in addition also have a further double bond in the ring system. The adding on of oxygen to the carbon-carbon double bond can take place according to the methods suitable for this purpose as described, for example, in Houben-Weyl, Methoden der organischen Chemie, vol. 3, 3rd edition, page 214 et seq. Thus, for example, the adding on of oxygen by means of organic peroxides, particularly of per-benzoic acid or per-phthalic acid has proved quite suitable, compare also, for example, Windaus, Berichte der deutschen chemischen Gesellschaft 48 (1915) page 1064.

The unsaturated compounds of the etio-cholane and pregnane series serving as starting materials can be of any suitable origin; they can contain instead of one several double bonds in the ring system. Furthermore, they can contain, particularly on the carbon atoms 3 and 17 functional groups, for example, hydroxyl groups or keto groups. The hydroxyl group can be converted by esterification, etherification, halogenation or the like into a group which by hydrolysis can be reconverted into the hydroxyl group. The keto group can also be substituted in a corresponding manner. The double bond in the ring system can also be in any suitable position, for example, between the carbon atoms 4 and 5, 5 and 6 or 16 and 17; also carboxylic acids of this series such as the 3-hydroxy cholenic acid and its lower homologues can be converted into corresponding oxides.

When alkenyl-like compounds of the etio-cholane series with unsaturated side chain on the carbon atom 17 are employed these can be obtained, for example, by partial hydrogenation of the corresponding alkinyl-like compounds, as are obtained by the action of acetylene in the presence of alkali metals on 17-keto-etio-cholanes. The alkenyl-like compounds can, however, also be obtained directly from the corresponding etio-cholane compounds when, for example, according to the process of specification Ser. No. 109,674 17-keto-etio-cholanes are caused to react with alkenyl metal organic compounds.

It may be further emphasized that under compounds of the etio-cholane series are intended to be understood not only the saturated and unsaturated compounds of the actual etio-cholane series but also those of the so-called etio-allocholane series.

The oxides obtained in the above described manner are now subjected to the action of hydrolysing agents.

According to a further feature of the invention, instead of employing the oxides for the manufacture of the glycol-like compounds, the corresponding unsaturated compounds, for example, the alkenyl-like compounds of the etio-cholane series can themselves be immediately converted into glycol-like compounds, for example by the action thereon of hydrogen peroxide, per-acetic acid or similar agents which are suitable for the attachment of the two OH groups to the carbon-carbon double bond. Particularly suitable for this purpose has proved osmium tetroxide which has only recently been used for such purposes, compare Criegee, Annalen der Chemie 522 (1936) page 75.

In order to explain the inventive idea the following formulae selected by way of example may serve:

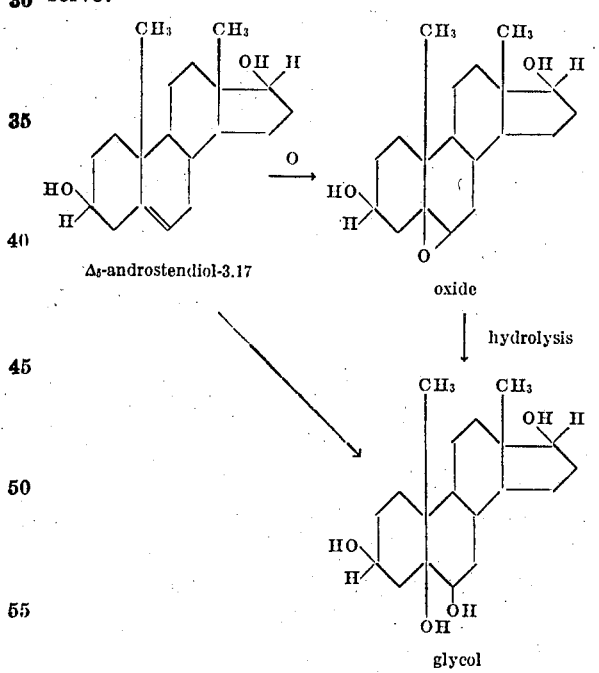

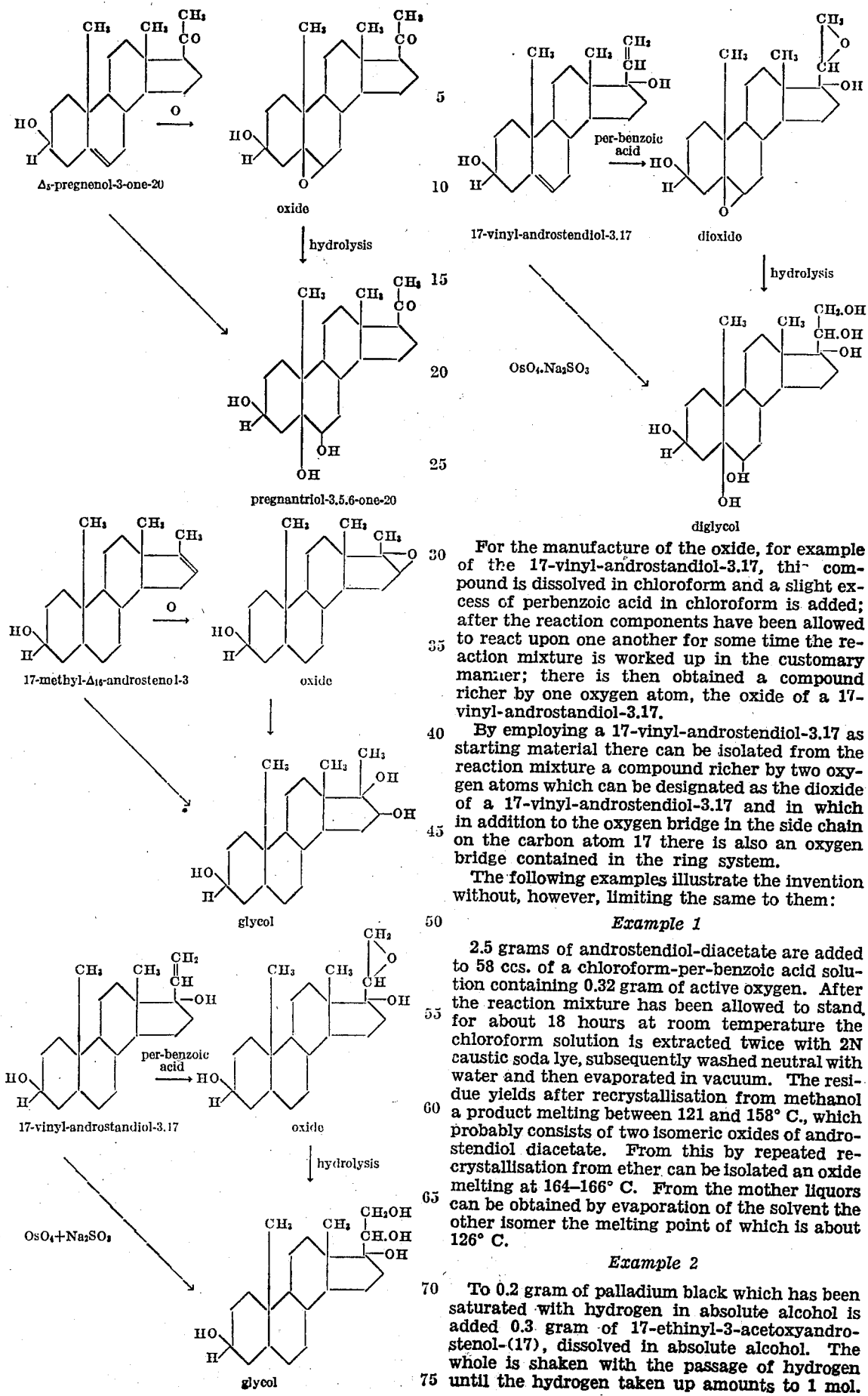

For the manufacture of the oxide, for example of the 17-vinyl-androstandiol-3.17, this compound is dissolved in chloroform and a slight excess of perbenzoic acid in chloroform is added; after the reaction components have been allowed to react upon one another for some time the reaction mixture is worked up in the customary manner; there is then obtained a compound richer by one oxygen atom, the oxide of a 17-vinyl-androstandiol-3.17.

By employing a 17-vinyl-androstendiol-3.17 as starting material there can be isolated from the reaction mixture a compound richer by two oxygen atoms which can be designated as the dioxide of a 17-vinyl-androstendiol-3.17 and in which in addition to the oxygen bridge in the side chain on the carbon atom 17 there is also an oxygen bridge contained in the ring system.

The following examples illustrate the invention without, however, limiting the same to them:

*Example 1*

2.5 grams of androstendiol-diacetate are added to 58 ccs. of a chloroform-per-benzoic acid solution containing 0.32 gram of active oxygen. After the reaction mixture has been allowed to stand for about 18 hours at room temperature the chloroform solution is extracted twice with 2N caustic soda lye, subsequently washed neutral with water and then evaporated in vacuum. The residue yields after recrystallisation from methanol a product melting between 121 and 158° C., which probably consists of two isomeric oxides of androstendiol diacetate. From this by repeated recrystallisation from ether can be isolated an oxide melting at 164–166° C. From the mother liquors can be obtained by evaporation of the solvent the other isomer the melting point of which is about 126° C.

*Example 2*

To 0.2 gram of palladium black which has been saturated with hydrogen in absolute alcohol is added 0.3 gram of 17-ethinyl-3-acetoxyandrostenol-(17), dissolved in absolute alcohol. The whole is shaken with the passage of hydrogen until the hydrogen taken up amounts to 1 mol.

The reaction solution is thereupon filtered off from palladium and treated with water. The precipitate thereby separated is filtered off and recrystallised from methanol. The product obtained has a melting point of 154–155° C.

0.21 gram of this compound is treated with 0.073 gram of per-benzoic acid dissolved in 20 ccs. of chloroform. The reaction mixture is allowed to stand in the dark for 24 hours. After this time the theoretically calculated quantity of 18.7 mg. of oxygen is consumed. Thereupon the chloroform solution is dried with magnesium sulphate and evaporated in vacuum. The residue is recrystallised from dilute methanol. There is obtained a mixture of isomeric dioxides of 3-acetoxy-17-ethenyl-androstenol-(17) which melts at 80° C.

The hydrolysis of the oxides, for example, those of alkenyl-like compounds is carried out, for example, in such a manner that the compound concerned, say the ethylene oxide of a 17-vinyl-androstendiol-3.17 is heated in an aqueous medium in a bomb tube.

The direct conversion, for example, of the alkenyl-like compounds into the corresponding glycol-like compounds takes place among others in such a manner that equivalent quantities, for example, of an alkylene like compound, such as a 17-vinyl-androstandiol-3.17 and osmium tetroxide are allowed to react upon one another in absolute ether and the osmium ester formed saponified under reducing conditions with an aqueous alcoholic solution of neutral sodium sulphite; on working up there is then obtained in the case of the example the glycol of 17-vinyl-androstendiol-3.17.

By employing as starting materials for the manufacture of the glycol-like compounds such oxides of alkenyl-like compounds as contain in addition to the oxygen bridge in the side chain on the carbon atom 17, also an oxygen bridge in the ring system, or such alkenyl-like compounds as contain in addition to the carbon-carbon double bond in the side chain also such a bond in the ring system, then by carrying out the process of the present invention products with two glycol groups in the molecule can be obtained.

As can be seen from the above, by means of the process of the invention it is also possible to produce such glycol-like compounds of the etio-cholane series as might more correctly be considered as glycerol-like compounds by employing such starting materials as contain on the carbon atom 17 in addition to the side chain also a hydroxyl group, that is to say substances of the type of the previously mentioned 3.17-diols.

Closer details regarding the mechanism of the processes hereinbefore set forth can be obtained from the customary text books, for example, from Houben-Weyl, Methoden der organischen Chemie, vol. 2, 2nd edition (1922), page 109 et seq., and also from the above mentioned publication Criegee, Annalen der Chemie, 522 (1936), page 75.

The compounds produced according to the present process are valuable products which either themselves possess physiological activity or can be converted into physiologically active substances.

Of course, many changes and variations in reaction conditions and the like may be employed by those skilled in the art in accordance with the principles set forth herein and in the claims annexed hereto.

What I claim is:

1. Process for the manufacture of polyhydric alcohols of the cyclopentano polyhydro phenanthrene series, comprising reacting a compound of the etio-cholane series having an unsaturated side chain on the carbon atom 17, with an agent capable of adding on an oxygen atom at a —C=C— group, and subjecting the reaction product to the action of a hydrolyzing agent.

2. Process for the manufacture of polyhydric alcohols of the cyclopentano polyhydro phenanthrene series, comprising reacting a 17-vinyl-androstandiol-3.17 with an agent capable of adding on an oxygen atom at a —C=C— group, and subjecting the reaction product to the action of a hydrolyzing agent.

3. Process for the manufacture of polyhydric alcohols of the cyclopentano polyhydro phenanthrene series, comprising reacting a 17-vinyl-androstendiol-3.17 with an agent capable of adding on an oxygen atom at a —C=C— group, and subjecting the reaction product to the action of a hydrolyzing agent.

4. Process for the manufacture of polyhydric alcohols of the cyclopentano polyhydro phenanthrene series, comprising reacting a compound of the etio-cholane or pregnane series having a double bond, with osmium tetroxide, and saponifying the osmium ester formed, whereby two hydroxyl groups are attached to the carbon-carbon double bond.

5. Process for the manufacture of polyhydric alcohols of the cyclopentano polyhydro phenanthrene series, comprising reacting a compound of the etio-cholane series having an unsaturated side chain on the carbon atom 17, with an agent capable of adding on an oxygen atom at a —C=C— group, to form an oxide of an alkenyl-like compound of the etio-cholane series containing an oxygen bridge in the side chain, and then reacting the oxide with a hydrolyzing agent.

6. Process for the manufacture of polyhydric alcohols of the cyclopentano polyhydro phenanthrene series, comprising reacting a compound of the etio-cholane series having an unsaturated side chain on the carbon atom 17, with an agent capable of adding on an oxygen atom at a —C=C— group, to form an oxide of an alkenyl-like compound of the etio-cholane series containing an oxygen bridge in the side chain, and heating the oxide in an aqueous medium in a bomb tube to hydrolyze the same.

7. Process for the manufacture of polyhydric alcohols of the cyclopentano polyhydro phenanthrene series, comprising reacting a compound of the etio-cholane series having an unsaturated side chain on the carbon atom 17 and containing a functional group at least at one of the carbon atoms 3 and 17, with an agent capable of adding on an oxygen atom at a —C=C— group, and subjecting the reaction product to the action of a hydrolyzing agent.

8. Aetio-cholyl-17-glycols of the general formula

wherein X represents a member of the group consisting of the saturated and unsaturated etio-cholane radicals.

9. 3.17-dioxy-etiocholyl-glycol-17.

10. 3.5.6.17-tetroxy-etiocholyl-glycol-17.

11. Oxides of the androstane and pregnane series containing the group

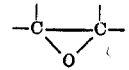

12. Oxide of 17-vinyl-androstandiol-3.17.

13. In a process for the manufacture of oxygenated compounds of the cyclopentano polyhydro phenanthrene series, the step which comprises reacting an unsaturated cyclopentano polyhydro phenanthrene compound having an unsaturated side chain, with an agent capable of adding on an oxygen atom at the point of unsaturation.

14. The oxygenated product of the reaction of a compound of the etio-cholane or pregnane series containing a double bond with a compound capable of adding on oxygen at the double bond.

15. Compounds of the cyclopentanoplyhydrophenanthrene series of the general formula

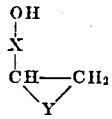

wherein X represents a member of the group consisting of saturated and unsaturated etiocholane radicals, which contain on the carbon atom 3 a substituent containing oxygen and Y is a member of the group consisting of oxygen and two hydroxyl groups, the group

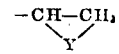

being attached to the 17-carbon.

16. Process for the manufacture of polyhydric alcohols of the cyclopentano polyhydro phenanthrene series, comprising reacting a compound of the etio-cholane series having a side chain on the carbon atom 17, and having a double bond both in the nucleus and in such side chain, with an agent capable of adding on an oxygen atom at a —C=C— group to form poly-oxides, and subjecting the reaction product to the action of a hydrolyzing agent.

WILLY LOGEMANN.